(No Model.)
T. VAN BECK.
PLOW CULTIVATOR TOOTH.
No. 533,510. Patented Feb. 5, 1895.
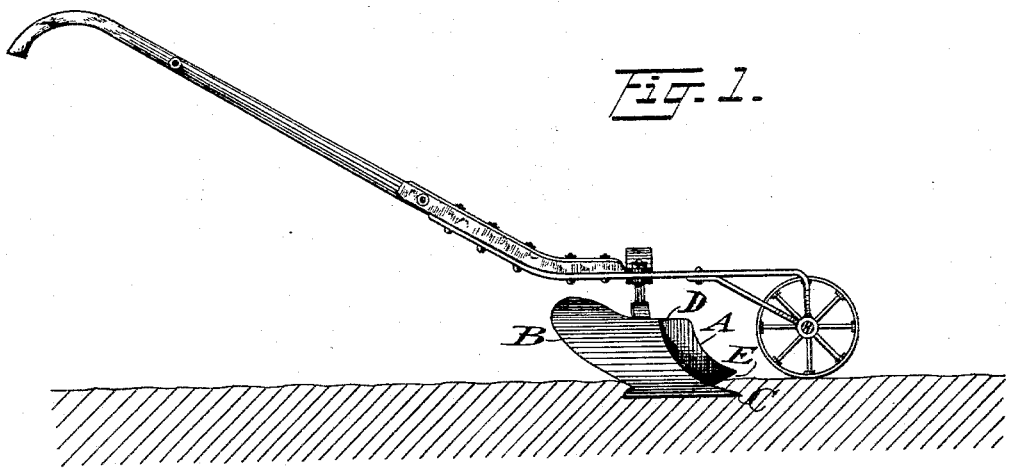
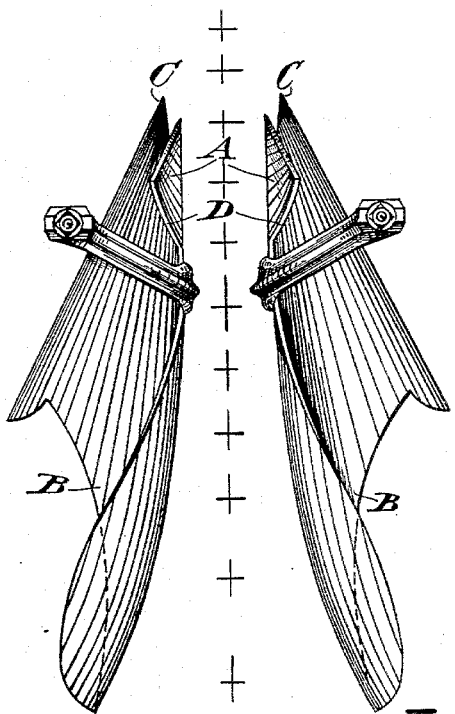
Witnesses:
F. G. Hubbard.
Clara L. Roesch.
Inventor.
Theodor. Van Beck
By Erwin Wheeler & Wheeler
Attorneys.

UNITED STATES PATENT OFFICE.

THEODOR VAN BECK, OF ST. FRANCIS, WISCONSIN.

PLOW CULTIVATOR-TOOTH.

SPECIFICATION forming part of Letters Patent No. 533,510, dated February 5, 1895.

Application filed June 19, 1894. Serial No. 515,036. (No model.)

*To all whom it may concern:*

Be it known that I, THEODOR VAN BECK, a citizen of the United States, residing at St. Francis, in the county of Milwaukee and State of Wisconsin, have invented new and useful Improvements in Plow Cultivator-Teeth, of which the following is a specification.

My invention relates to improvements in plow cultivator teeth.

The object of my invention is to provide means whereby a deep cutting cultivator tooth can be run close to the line of vegetation, without uprooting or covering the plants, and pertains more especially to garden and hand cultivators used in close cultivation.

In the following description reference is had to the accompanying drawings, in which—

Figure 1. is a side view showing my invention as applied to an ordinary hand cultivator. Fig. 2. is a top view of the cultivator teeth.

Like parts are referred to throughout by means of the same reference letters.

The weeding of garden vegetables is a laborious and expensive process, as the weeds have to be pulled out from among the young and tender plants by hand, no tools having as yet been constructed that are practically adapted to this purpose. For this reason it is especially desirable that the cultivator should be run as close as possible to the line of vegetation, in order to facilitate weeding and leave as little space as possible to be weeded. The ordinary plow cultivators hitherto constructed have not been adapted for this work, especially at the first weeding, when the plants are very small, in that much of the soil is thrown to the land side of the tooth, covering and destroying the tender plants, and also uprooting them if the soil is hardened or incrusted. The shallow running cultivators are also defective in operation, in that they do not penetrate hard soils, but often simply scrape the surface, breaking and cutting off the weeds, but not up-rooting them; also one of the advantages of deep cultivation is found in the fact that the weeds in the plant row can be pulled out laterally into the loose soil, thus greatly facilitating the weeding process.

In order therefore, to derive the advantages of deep and close cultivation without injuring the young plants, I have formed a flange A on the front edge of an ordinary plow cultivator tooth B, which projects forward in a plane substantially parallel to the line of vegetation, and acts as a guard or shield to keep the earth from being thrown in the direction of the plants.

The flange A is united with the tooth proper from a position somewhat in the rear of and above the point C to near the upper edge D of the tooth, and its lower edge E projects forward from the line of union to an appropriate distance in front of the tooth and above or near the surface of the ground. In hard soils the lower edge E of the flange A acts as a colter to ride upon and cut through the crust of the soil downwardly to prevent it from lifting or riding up on the tooth and up-rooting the plants.

The flange A is preferably bent slightly toward the mold-board of the plow near its upper end, and slightly toward the line of vegetation at the lower end, in order to facilitate throwing the soil upon the mold-board. It may be applied to any form of plow cultivator teeth and enables the teeth to be run very closely to the line of vegetation, without injuring the plants.

Having thus described my invention, what I claim as new, and desire to secure by Letters Patent, is—

1. The combination with the front edge of a cultivator tooth, of a plant protecting shield, consisting of a forward projecting flange in a vertical plane substantially parallel to that in which the cultivator moves when in use, with the forward upper corner of said flange bent or curved toward the moldboard, and the forward lower corner bent or curved in the opposite direction, substantially as described and adapted to the purpose set forth.

2. The combination with the front edge of a cultivator tooth of a forward projecting flange A formed integrally therewith adapted to act as a guard or shield to keep young plants from being covered by the loosened earth, and having a lower edge E thereon, adapted to project partly above and to cut downward through the surface of the soil, substantially as described.

In testimony whereof I affix my signature in the presence of two witnesses.

THEODOR VAN BECK.

Witnesses:
JAS. B. ERWIN,
LEVERE H. C. WHEELER.